(12) United States Patent
Hornsby et al.

(10) Patent No.: US 11,653,069 B2
(45) Date of Patent: May 16, 2023

(54) SUBTITLE SPLITTER

(71) Applicant: Snap Inc., Santa Monica, CA (US)

(72) Inventors: David Michael Hornsby, Surrey (GB); David Paliwoda, London (GB); Georgiy Kassabli, London (GB); Kevin Joseph Thornberry, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/821,767

(22) Filed: Aug. 23, 2022

(65) Prior Publication Data

US 2023/0056060 A1 Feb. 23, 2023

Related U.S. Application Data

(63) Continuation of application No. 16/948,023, filed on Aug. 27, 2020, now Pat. No. 11,432,049.

(60) Provisional application No. 62/893,509, filed on Aug. 29, 2019.

(51) Int. Cl.
| | |
|---|---|
| *H04N 21/488* | (2011.01) |
| *H04N 21/472* | (2011.01) |
| *H04N 21/845* | (2011.01) |
| *H04N 21/439* | (2011.01) |

(52) U.S. Cl.
CPC ..... *H04N 21/4884* (2013.01); *H04N 21/4394* (2013.01); *H04N 21/47217* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 2005/0078947 A1 | 4/2005 | Chung et al. | |
| 2007/0253678 A1* | 11/2007 | Sarukkai | G06F 16/7844 707/E17.028 |
| 2016/0086636 A1* | 3/2016 | Huang | G11B 27/329 386/241 |
| 2021/0067836 A1 | 3/2021 | Hornsby et al. | |

FOREIGN PATENT DOCUMENTS

CA 2544391 C * 3/2012 ............ G11B 27/10

OTHER PUBLICATIONS

"U.S. Appl. No. 16/948,023, Non Final Office Action dated Sep. 2, 2021", 32 pgs.
"U.S. Appl. No. 16/948,023, Notice of Allowance dated Apr. 20, 2022", 10 pgs.
"U.S. Appl. No. 16/948,023, Response filed Jan. 3, 2022 to Non Final Office Action dated Sep. 2, 2021", 10 pgs.

* cited by examiner

*Primary Examiner* — Heather R Jones
(74) *Attorney, Agent, or Firm* — Schwegman Lundberg & Woessner, P.A.

(57) ABSTRACT

Systems and methods are provided for presenting subtitles in association with a composite video. The systems and methods include a facility for uploading a subtitle file having the full subtitles information for the entire composite video. The uploaded subtitle file is then split to generate video content item subtitles files that correspond to video content items in the composite video.

20 Claims, 10 Drawing Sheets

SUBTITLE SPLITTER

CLAIM OF PRIORITY

This application is a continuation of U.S. application Ser. No. 16/948,023, filed on Aug. 27, 2020, which claims the benefit of priority to U.S. Provisional Application Ser. No. 62/893,509, filed on Aug. 29, 2019, which are incorporated herein by reference in their entirety.

TECHNICAL FIELD

The present disclosure relates generally to subtitles for media content presented on mobile devices.

BACKGROUND

Users of mobile devices often consume videos without audio to avoid disrupting other people in their surroundings. While many videos can be enjoyed without audio, adding subtitles to videos enhances the user experience.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
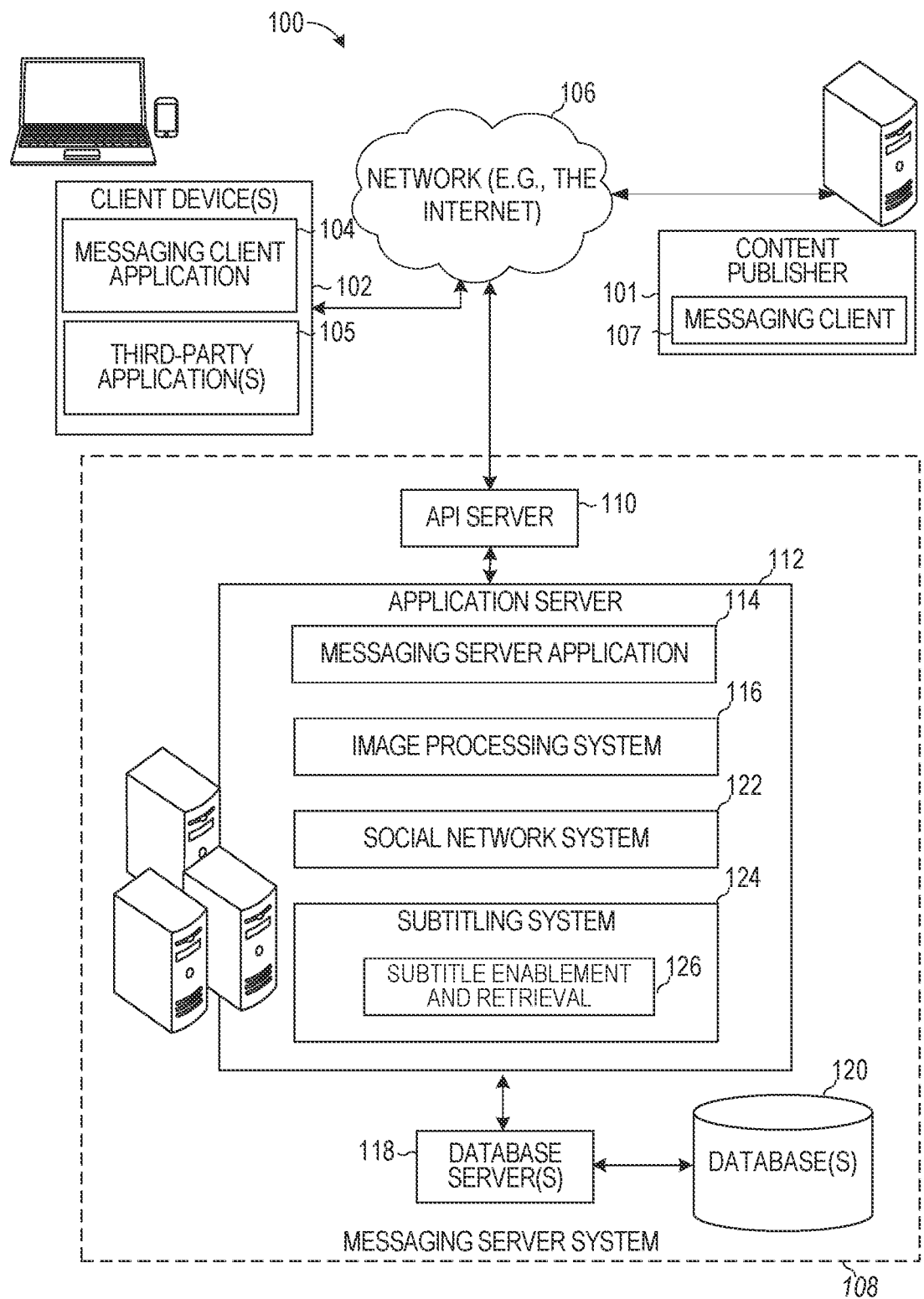
FIG. 1 is a block diagram showing an example messaging system for exchanging data (e.g., messages and associated content) over a network, according to example embodiments.

Increasingly, electronic devices such as smartphones, tablets and laptops are used as convenient playback devices for streamed and/or downloaded multimedia content such as video content. Often, users consume content, and specifically video content, on their mobile device without audio (i.e. voice, music or other sound). Most content consumed by users can be enjoyed without sound. In many cases, however, the overall enjoyment of the content can be enhanced with the addition of subtitles. Much content that users consume on mobile devices is user-generated. This is particularly true in the case of content consumed on social media platforms. However, typical systems fail to provide an easy-to-use and resource-efficient interface to generate subtitles and, as a result, the user-generated content typically does not include subtitles. Where content (user-generated, professionally curated, or otherwise prepared for consumption) has been generated as a composite of video content items, the task of a content publisher in generating appropriate subtitles to accompany that composite video becomes time-consuming and error-prone.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

The disclosed embodiments provide a subtitling system that improves content publishers' efficiency by providing a flexible and easy-to-user interface for providing subtitles for content in preparation for publication.

The subtitling system, according to the disclosed embodiments, also improves efficiency and convenience for the end user using their electronic device to consume the composite video by ensuring that the subtitles delivered to the electronic device more accurately correlate to the portions of the composite video being reproduced at the electronic device.

The content publisher may previously have added subtitles to individual video content items by dragging a corresponding subtitles file, such as a SubRip Text file (SRT) or Video Timed Text file (VTT), over an icon or representation of the given video and/or by selecting an upload option for the given video content item. Alternatively, the content publisher may have added subtitles manually, entering the text of subtitles through a text entry interface, together with the start and stop time of each entry. Once added, the subtitles are automatically processed and associated with the given video and made available for consumption to other users when the video is shared on a messaging application.

According to the disclosed embodiments, a content publisher interface is provided that allows a given content publisher to upload a single subtitle file (i.e. a "full subtitle file") having the full subtitles information for an entire composite video. The uploaded full subtitle file is then split to generate a plurality of component video content item subtitle files that correspond to the video content items in the composite video.

In this way, the disclosed embodiments simplify the tasks involved in providing subtitles for composite video content in preparation for publication by reducing the need to manually enter text and/or determine which subtitle file to link to which component video content item (if any). The content publisher is spared unnecessary complexity in providing subtitles for component video content items and the number of screens and interfaces that the content publisher must navigate to ensure that each component video content item has the correct, associated, subtitles. This in turn reduces the processing resources (e.g., processor cycles, memory, and power usage) needed to accomplish a task with the subtitling system.

Although subtitles and closed-captions (CC) may include different content, the term "subtitles" used in this disclosure applies equally to both. Specifically, subtitles provide a text alternative for dialogue of video footage—the spoken words of characters, narrators, and other vocal participants—while CC not only supplements dialogue like subtitles, but also includes other relevant parts of the soundtrack describing background noises, phones ringing, and other audio cues the need to be described. Subtitles may be prepared to replicate the words used in the video audio track: they may alternatively be translations (into another spoken language and/or character set) and they may represent a commentary or other supplement to the video content in the video footage.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a third-party application 105. The messaging system 100 may further include one or more content publishers 101, each of which hosts a number of applications including a messaging client application 107.

Each messaging client application 104, 107 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104 & 107, third-party applications 105, and between a messaging client application 104 & 107 and the messaging server system 108 includes functions (e.g., commands to invoke functions) and payload data (e.g., text, audio, video, or other multimedia data). Any disclosed communications between the messaging client application 104 & 107 and the third-party application(s) 105 can be transmitted directly from the messaging client application 104 & 107 to the third-party application(s) 105 and/or indirectly (e.g., via one or more servers) from the messaging client application to the third-party application(s) 105.

The third-party application(s) 105 and the messaging client application 104 are applications that include a set of functions that allow the client device 102 to access a subtitling system 124. Likewise, the messaging client application 107 includes a set of functions that allow the content publisher 101 to access the subtitling system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

In some embodiments, the messaging client application 104 may present a user with a video discovery graphical user interface. The video discovery graphical user interface may display one or more interactive representations (e.g., icons or thumbnails) that identify respective videos. The messaging client application 104 receives a user selection of a first one of the interactive representations. In response to receiving the user selection, the messaging client application 104 retrieves a first video that corresponds to the selected interactive representation and plays back or displays (i.e. "reproduces") the video. In some cases, the first video may be a composite video comprising a sequence of one or more video content items (e.g., 10 second video clips). The user can advance between each video clip in the video by tapping (physically touching for less than a threshold period of time (e.g., 1 second)) on the screen. In response to the user tapping on the screen, the messaging client application 104 retrieves a next video clip in the sequence. Once all of the video clips or once the first video is completely played back, a second video may be selected (e.g., by the user manually selecting a particular interactive representation or automatically by selecting a video that matches user interests). The second video may be played back and presented to the user.

In some embodiments, the messaging client application 104 presents a graphical user interface that allows a user to upload and edit one or more videos to be shared with one or more other users. Similarly, the messaging client application 107 may present a graphical user interface that allows a content publisher to upload and edit videos to be shared with one or more other users. After or before uploading a given video, the user can also upload a subtitles file for the video, see FIG. 7A. The messaging client application 104 may allow the user to upload the subtitles file by dragging the subtitles file over an identifier (i.e. a graphical element) of the given video the user has uploaded and/or by selecting an upload option in an editing interface.

After the subtitles file is uploaded, the contents of the subtitles file may be presented in a three-part display (one part for displaying content of the subtitles file, a second part for displaying a preview of the video, and a third part for providing editing options for the video). Using the graphical user interface, the user can review, modify, and change timing of various subtitles that are provided for the video. Once the user is satisfied, the user can save the video and share the video, which now includes the associated subtitles file, with other users.

Figure 7A:
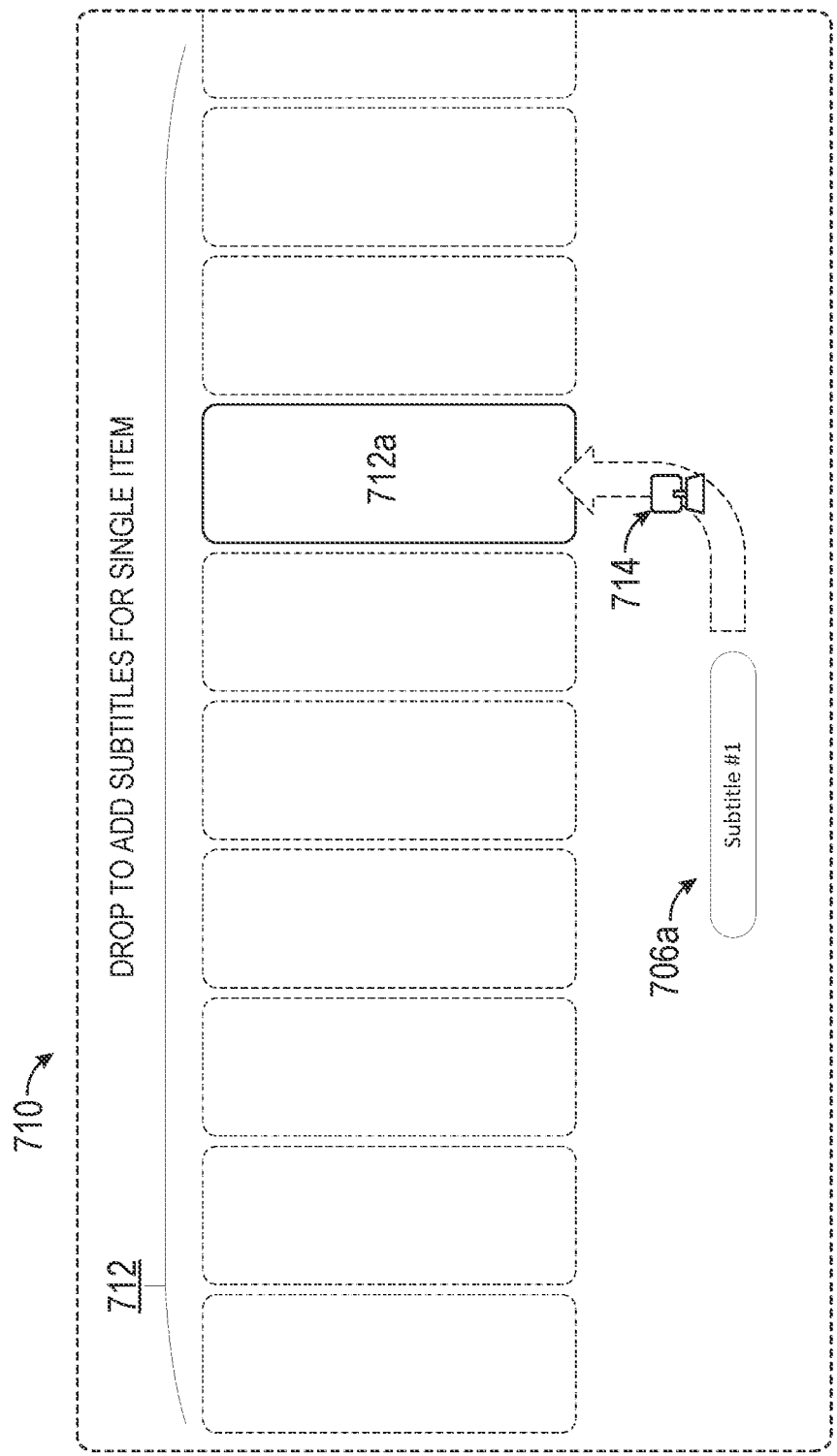
FIG. 7A is block diagram illustrating a user interface for a subtitling system.
Figure 7B:
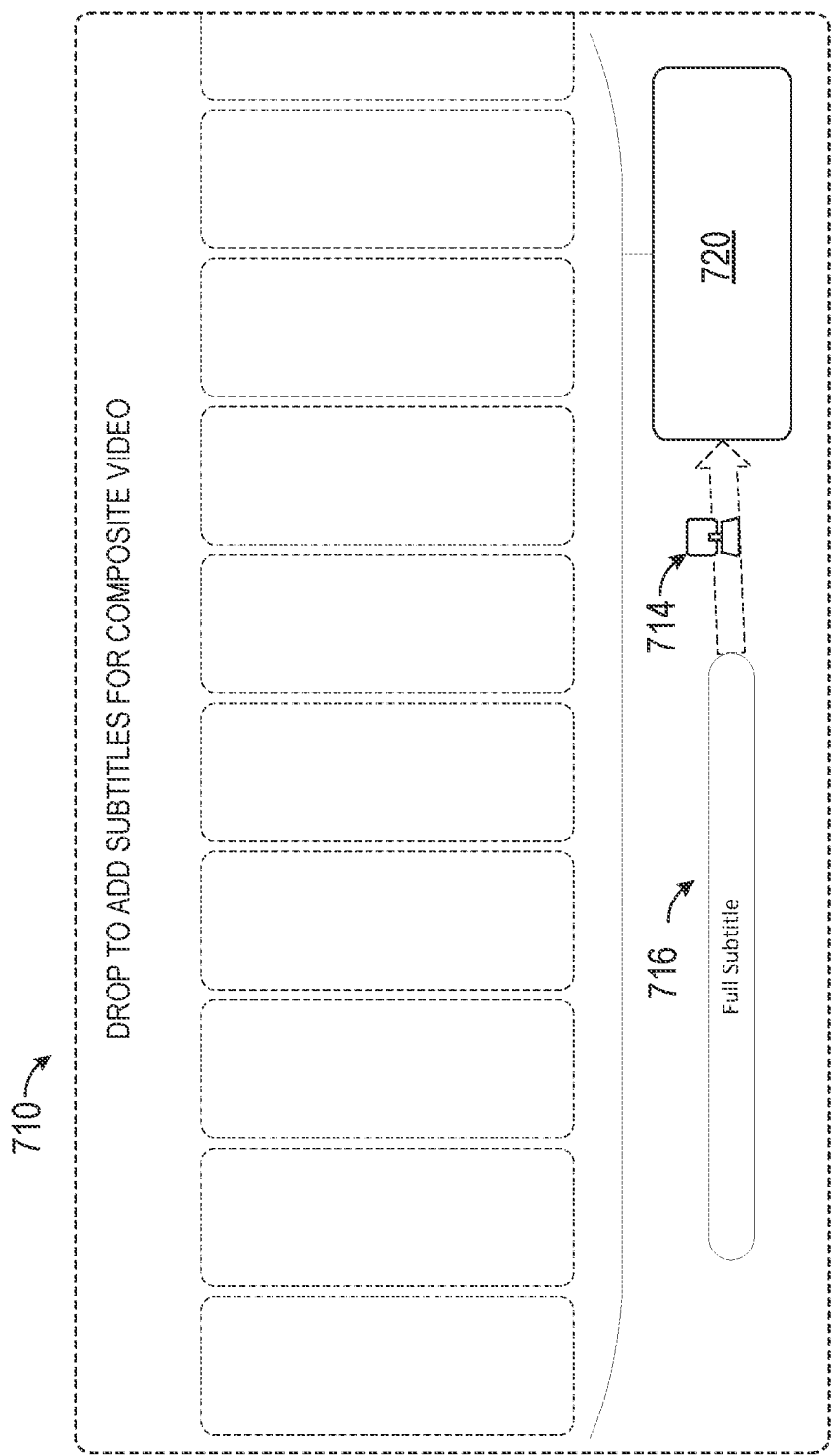
FIG. 7B is block diagram illustrating a user interface with a full subtitle upload option for a subtitling system according to example embodiments.

In some embodiments, the graphical user interface of the messaging client application 104 and/or the messaging client application 107 allows the upload of a full subtitles file having subtitle text items corresponding to the component video content items in a composite video, see FIG. 7B.

The messaging server system 108 provides server-side functionality via the network 106 to a particular messaging client application 104 or 107. While certain functions of the messaging system 100 are described herein as being performed by either a messaging client application 104/107 or by the messaging server system 108, it will be appreciated that the location of certain functionality either within the messaging client application 104/107 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104/107.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the subtitling system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the subtitle control system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The subtitling system 124 allows users and/or content publishers to add subtitles to content they create (e.g., user-generated content) and/or controls automatic presentation of subtitles for content being consumed by a given user. For example, subtitling system 124 presents a simple and straight-forward graphical user interface that allows a given user to view videos generated and provided by the given user. The given user can selectively add subtitles to one or more of the videos by simply dragging a subtitles file, such as a SubRip Text file (SRT) or Video Timed Text file (VTT), over an icon or representation of the given video and/or by selecting an upload option for the given video. Once added, the subtitles are automatically processed and associated with the given video and made available for consumption to other users when the video is shared on a messaging application.

In some embodiments, the subtitling system 124 controls whether to present subtitles for a given video being consumed based on a user-defined profile.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated and hosted by a second, different entity. In some implementations, database 120 stores user data that the first entity collects about various each of the users of a service provided by the first entity. For example, the user data includes user names, passwords, addresses, friends, activity information, preferences, videos or content consumed by the user, and so forth.

Figure 2:
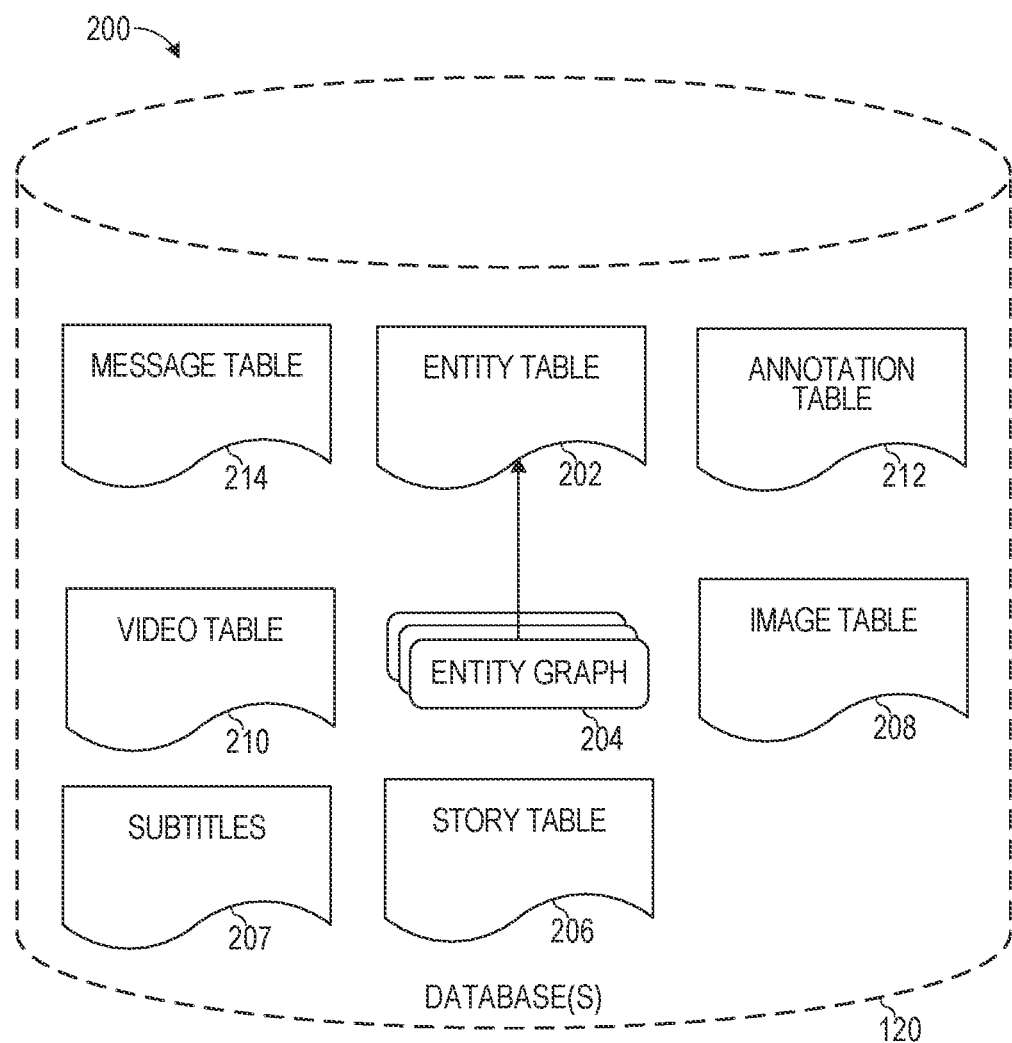
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 208 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Subtitles 207 stores subtitles for one or more videos available for consumption by the messaging client application 104/107. Namely, subtitles 207 stores one or more subtitles file (e.g., an SRT and/or VTT file) and a link to the associated video for the subtitles file. In some implementations, subtitles that are received for a given video are stored in two formats (e.g., SRT and VTT). Specifically, in response to a given user uploading a subtitles file in a first format (e.g., an SRT file), the subtitles file in the first format is stored in association with the corresponding video. Also, the subtitles file in the first format is automatically converted to a subtitles file in a second format (e.g., a VTT file) and also stored in association with the video in the second format. A given request for subtitles for a given video may specify the type of device on which the subtitles are to be presented and the corresponding subtitles in the first or second format are retrieved and returned for presentation with the video.

When subtitles for a given component video content item being played or presented are enabled (e.g., a determination is made by the subtitle control system 124 to automatically present subtitles), the subtitles 207 for the given video are accessed and retrieved (e.g., by obtaining a title or identifier of the given video content item being consumed and searching the subtitles 207 for any subtitles that are linked to the title or identifier of the given video content item). The subtitles retrieved from subtitles 207 that are linked to the given video being played are then presented together with the given video content item being played.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
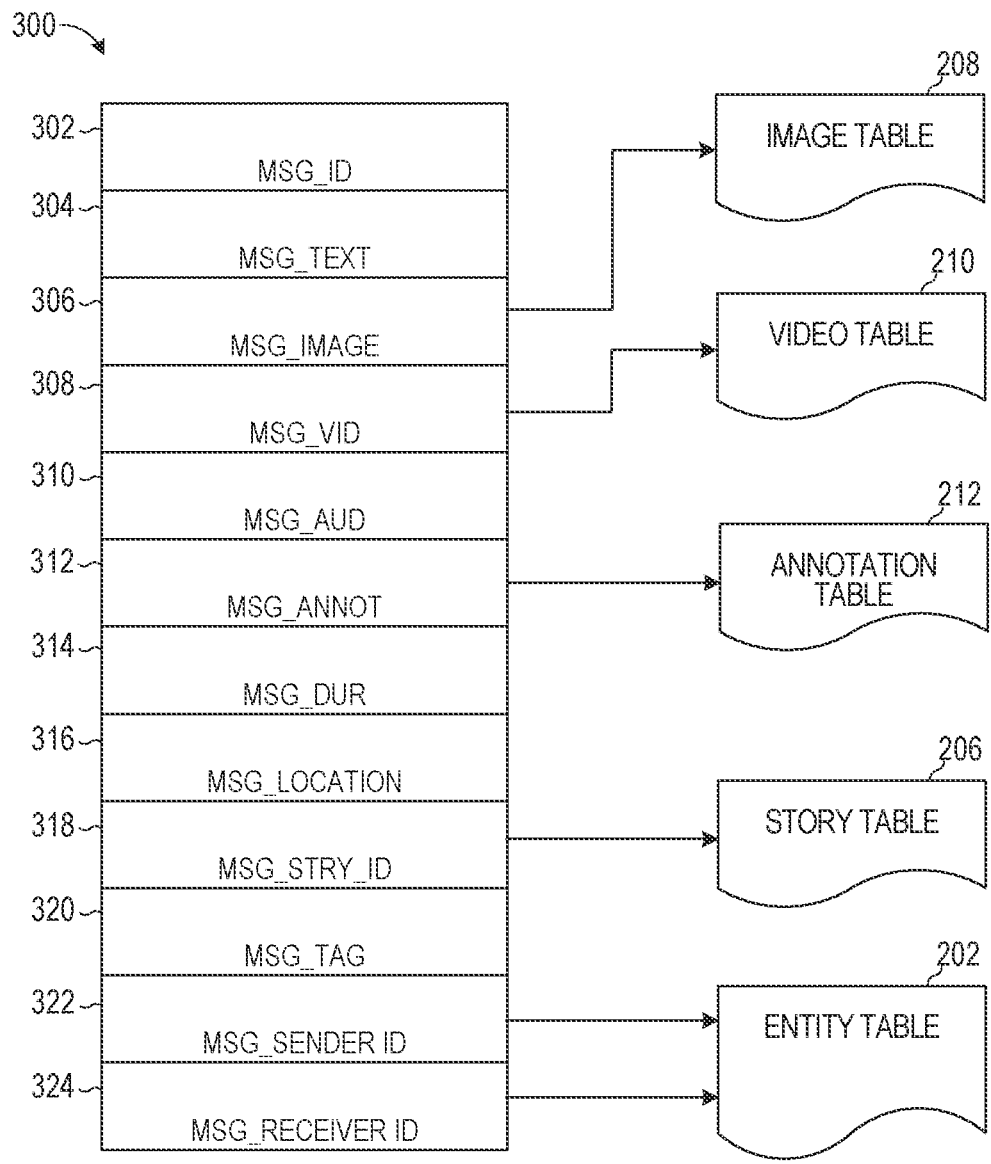
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104/107 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

- A message identifier 302: a unique identifier that identifies the message 300.
- A message text payload 304: text, to be generated by a user via a UI of the client device 102 and that is included in the message 300.
- A message image payload 306: image data, captured by a camera component of a client device 102 or retrieved from memory of a client device 102, and that is included in the message 300.
- A message video payload 308: video data, captured by a camera component or retrieved from a memory component of the client device 102 and that is included in the message 300.
- A message audio payload 310: audio data, captured by a microphone or retrieved from the memory component of the client device 102, and that is included in the message 300.
- Message annotations 312: annotation data (e.g., filters, stickers, or other enhancements) that represents annotations to be applied to message image payload 306, message video payload 308, or message audio payload 310 of the message 300.
- A message duration parameter 314: parameter value indicating, in seconds, the amount of time for which content of the message (e.g., the message image payload 306, message video payload 308, message audio payload 310) is to be presented or made accessible to a user via the messaging client application 104.
- A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).
- A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.
- A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.
- A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
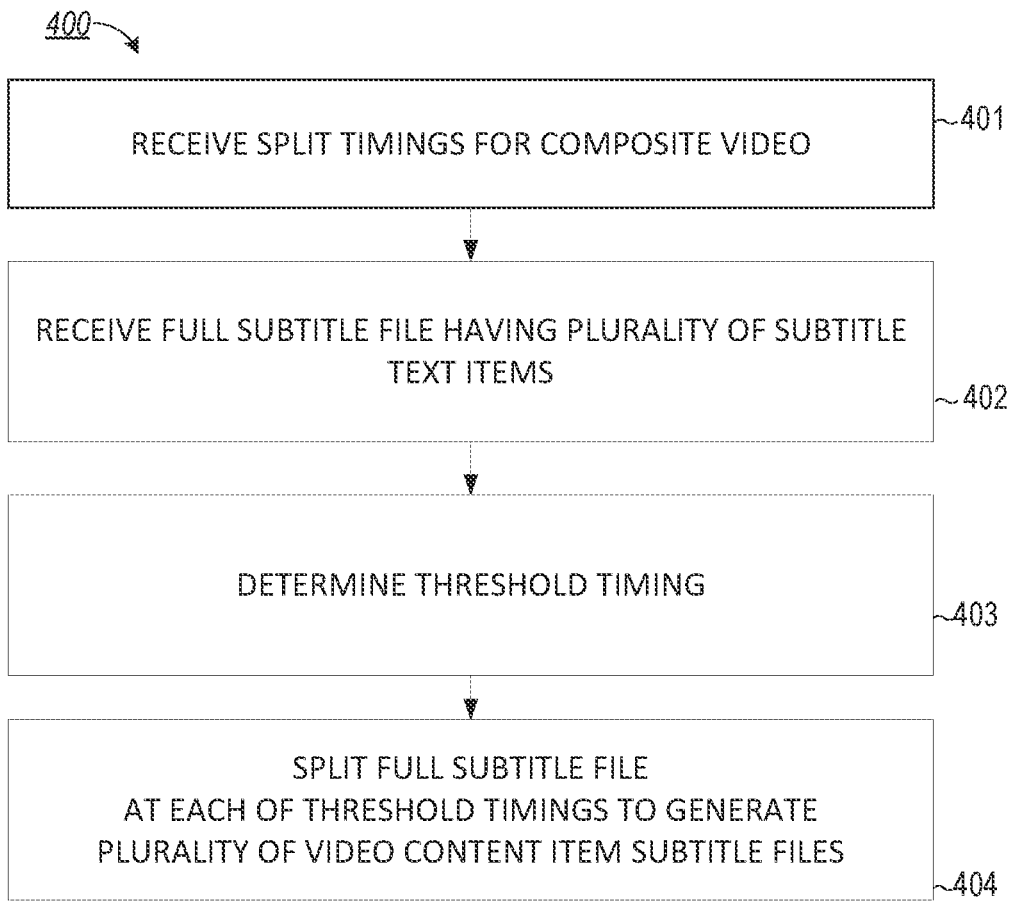
FIG. 4 is a flowchart illustrating example operations of a subtitling system according to example embodiments.

FIG. 4 is a flowchart illustrating example operations of a subtitling system according to example embodiments. In block 401, the subtitling system 124 receives split timings for a composite video comprising a plurality of video content items arranged in playback sequence, each split timing indicating the time point in the composite video bounding respective successive video content items, the time points being defined relative to a video base time point.

In block 402, subtitling system 124 receives a full subtitle file having a plurality of subtitle text items, each subtitle text item having an associated timing relative to a subtitle base time point.

In block 403, subtitling system 124 determines a corresponding threshold timing for each of the time points indicated by the split timings.

In block 404, subtitling system 124 splits the full subtitle file at each of the threshold timings to generate a plurality of video content item subtitle files, each video content item subtitle file including subtitle text items that have associated timings between successive threshold timings.

In certain embodiments, the subtitling system 124 operates to control the playback of at least one of the video content items by determining whether a client device is to display said at least one video content item together with the subtitle text items in the corresponding video content item subtitle file.

In certain embodiments, the subtitling system 124 operates to make the generated video content item subtitle files available for consumption to end users (e.g. using the client device's messaging client application 104) when the composite video is shared on a messaging application.

The subtitles are presented simultaneously over or next to the video frames of the video. In some cases, a language of the device is searched to determine whether language is desired in a specific language other than a default language. If so, the subtitles in the desired language (if available) are retrieved and displayed.

In some embodiments, a subtitle enablement and retrieval module 126 of the subtitling system 124 may access a display characteristics field that is stored on the user device. The subtitle enablement and retrieval module 126 may modify the display characteristics (e.g., the font size, color, and shape) of the subtitles that are presented with the video being played. The subtitles may be presented on an area of the screen that does not impede any important aspect of the video content.

In some embodiments, the subtitle enablement and retrieval module may monitor user interactions while the video is being played to determine whether to display subtitles. In response, the subtitle enablement and retrieval module may automatically retrieve and display subtitles for a video content item being played back and any subsequent video content items that are played back.

Referring back to FIG. 1, in some embodiments, the subtitle enablement and retrieval module 126 may access the default global subtitles setting of the user device to determine whether to display subtitles. In response to determining that the default global subtitles setting of the user device is set to the enabled state, the subtitle enablement and retrieval module 126 may automatically retrieve and display subtitles for a video content item being played back and any subsequent video content items that are played back.

Figure 5:
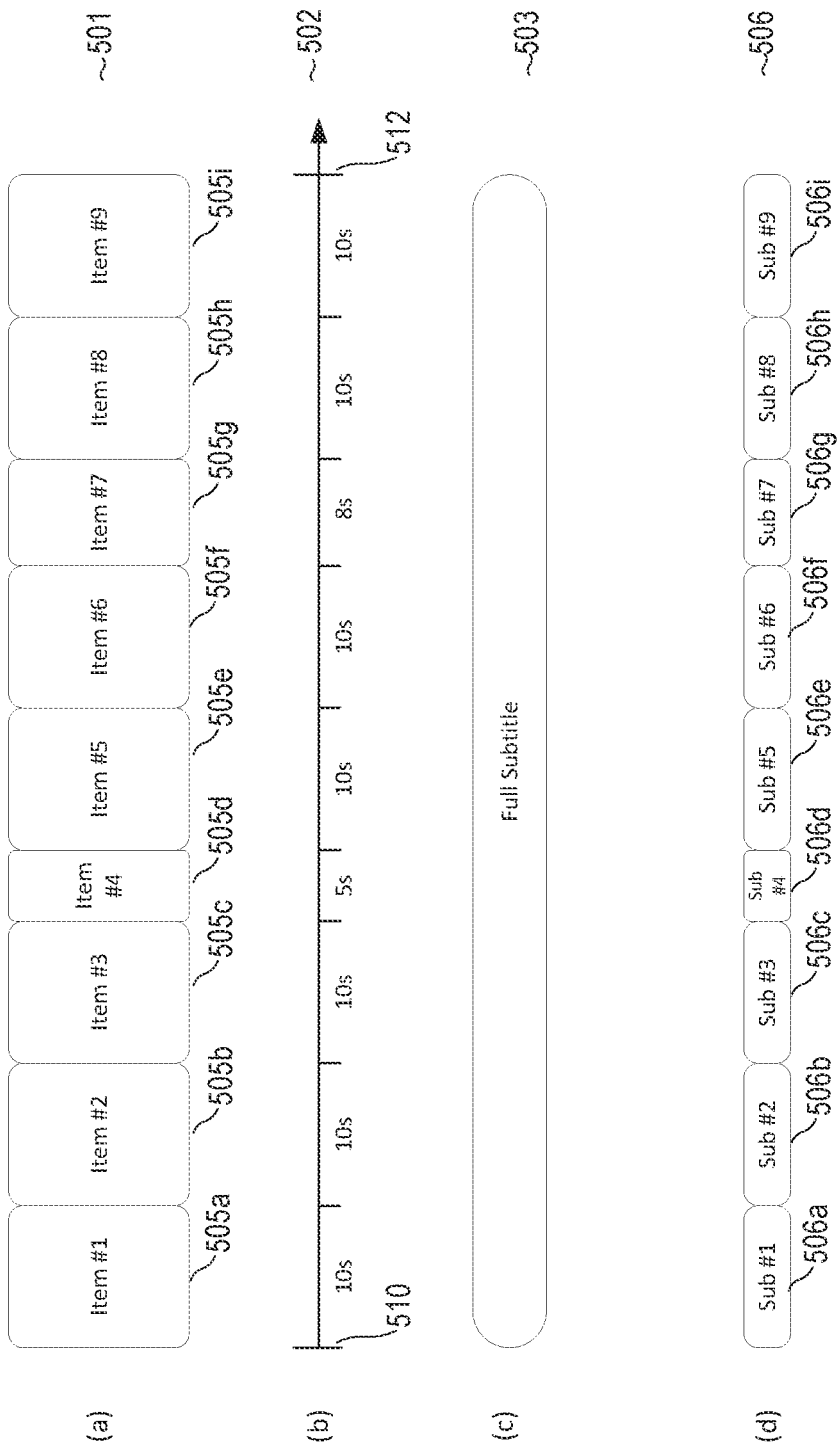
FIG. 5 is a block diagram illustrating the input and output of the subtitling system, according to example embodiments.

FIG. 5 is block diagram illustrating the input and output of the subtitling system, according to example embodiments.

At FIG. 5(*a*), an illustration is given of a composite video 501 comprising a plurality of video content items 505*a-i* (e.g. video clips"). Some of the clips 505*a-i* are of 10 s duration, others are shorter: see items #4 and #7, for instance. The composite video 501 is shown with the intended (time-ordered) playback sequence from left to right.

At FIG. 5(*b*), the diagram shows a timeline 502 representing split timings corresponding to the composite video of FIG. 5(*a*). Using these split timings (relative to a reference point, such as the leftmost point 510 on the timeline), it is possible to navigate to the start point of each item by summing the intervening durations.

At FIG. 5(*c*), the diagram shows a full subtitle file 503, corresponding to the composite video 501, as a single block of the same duration as the runtime of composite video 501. The structure of a subtitle file is discussed in more detail below.

At FIG. 5(*d*), the diagram shows series 506 of subtitle files 506*a-i*. The subtitle files 506*a-i* correspond to respective video content items in the composite video, 505*a-i*: so that subtitle file 506*a* includes subtitle text items corresponding to the video content item 505*a*, subtitle file 506*b* includes subtitle text items corresponding to the video content item 505*b*, etc.

Figure 6:
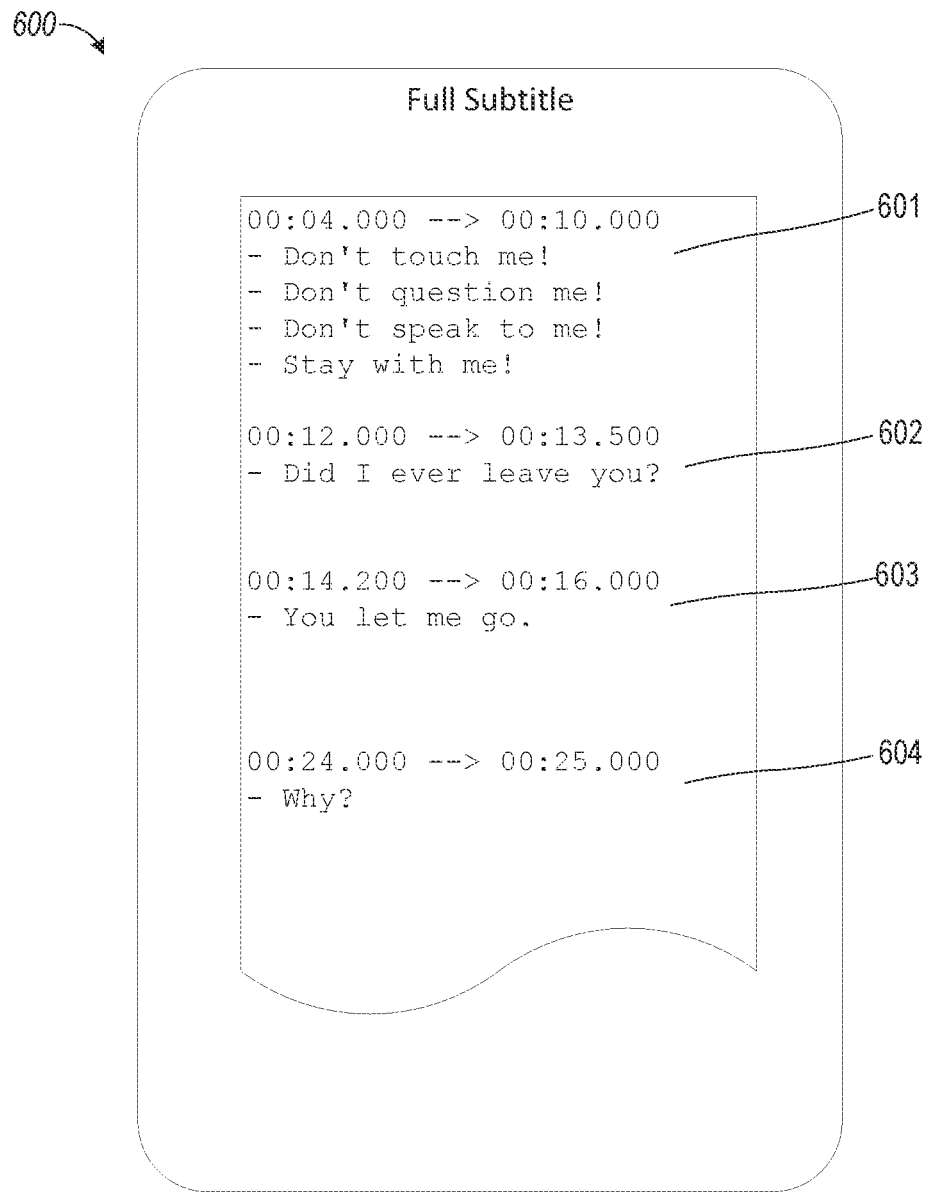
FIG. 6 is a block diagram illustrating the structure of an example subtitle file.

FIG. 6 is block diagram illustrating the structure of a subtitle file 600 such as the full subtitle file 503.

A subtitle file in .vtt (or .srt) format includes at least one subtitle text item comprising a subtitle text and a formal indication of the start time (from which time the subtitle text is to be displayed) and stop time (at which display of the subtitle is to cease). In FIG. 6, four such subtitle text items 601, 602, 603, 604 are illustrated.

Considering subtitle text item 603, for example, it can be seen that the text "You let me go." is to start at a time point 14.2 seconds from a reference time and to cease at a time point 16 seconds from that same reference time.

To illustrate the splitting of a full subtitle file, consider an example composite video having a first component video content item of 10 second duration, a second component video content item of 5 second duration, and a third component video content item of 10 second duration. The subtitle file 600 in FIG. 6 may stand in as a full subtitle file for this example composite video.

Subtitle text items with timings in the first 10 seconds of the composite video are split into a first video content item subtitle file. In this case, the first video content item subtitle file includes only subtitle text item 601.

Subtitle text items with timings in the next 5 seconds (i.e. between 10 and 15 seconds from start) of the composite video are split into a second video content item subtitle file. In this case, the second video content item subtitle file includes subtitle text item 602.

Subtitle text items with timings in the next 10 seconds (i.e. between 15 and 25 seconds from start) of the composite video are split into a third video content item subtitle file. In this case, the third video content item subtitle file includes subtitle text item 604.

Subtitle text item 603, however, bridges the end time of the second video content item and the start time of the subsequent third video content item. In certain embodiments, such subtitle text items are "split" by being included in both the second video content item subtitle file and the third video content item subtitle file. In some examples, such subtitle text items are "split" (e.g., included in both the second video content item subtitle file and the third video content item subtitle file) if the subtitle text item straddles the end time of the second video content item and the start time of the subsequent third video content item for greater than a threshold amount of time. Otherwise, if the subtitle text item straddles the end time of the second video content item and the start time of the subsequent third video content item for less than the threshold amount of time, the subtitle text item is only present on the second video content item and omitted from the third video content item. In some examples, the threshold amount of time may be 250 milliseconds, however it is understood that any suitable threshold amount of time may be used.

In some subtitle formats, a subtitle file may be structured with subtitle text items and one or more header items. Header items may specify a preferred style for the displayed subtitle text. Style characteristics such as font, font size, color, kerning, and position in screen may be defined as header items. In a full subtitle file, the header items may appear at one position within the body of the file. Splitting of a full subtitle file into individual video content item subtitle files may include replicating at least a portion of the header item of the full subtitle file in one or more of the individual video content item subtitle files. Consequently, the system ensures that individual video content item subtitle files inherit the style characteristics of the full subtitle file.

FIG. 7A is block diagram illustrating a user interface 710 for a content publisher or end user content generator.

The user interface 710 includes elements corresponding to respective video content items 712. The interface user selects a subtitle file 706a (e.g. by selecting an icon representing that file) and indicates which video content item 712a the selected subtitle file should be associated (e.g. by dragging that icon to an element in the user interface corresponding to the intended item). In FIG. 7A, the user interface 710 includes a cursor 714 that is manipulated by the user to indicate the selection of subtitle file and intended association with a specific video content item 712.

In accordance with some embodiments, a full subtitle upload option is provided in the user interface 710. FIG. 7B is block diagram illustrating a user interface 710, similar to that in FIG. 7A, with a full subtitle upload option.

Rather than drag an icon to a particular video content item, the user may elect to drag the icon 716 representing a batch of subtitles associated with a composite video comprising a plurality of video content items (i.e. a full subtitle file) to an element 720 in the user interface corresponding to the entire composite video.

In the latter case, the dragging of the full subtitle file icon 716 to the composite video element 720 in the user interface is interpreted as a trigger event for the operations of the subtitling system such as those illustrated in FIG. 4.

Figure 8:
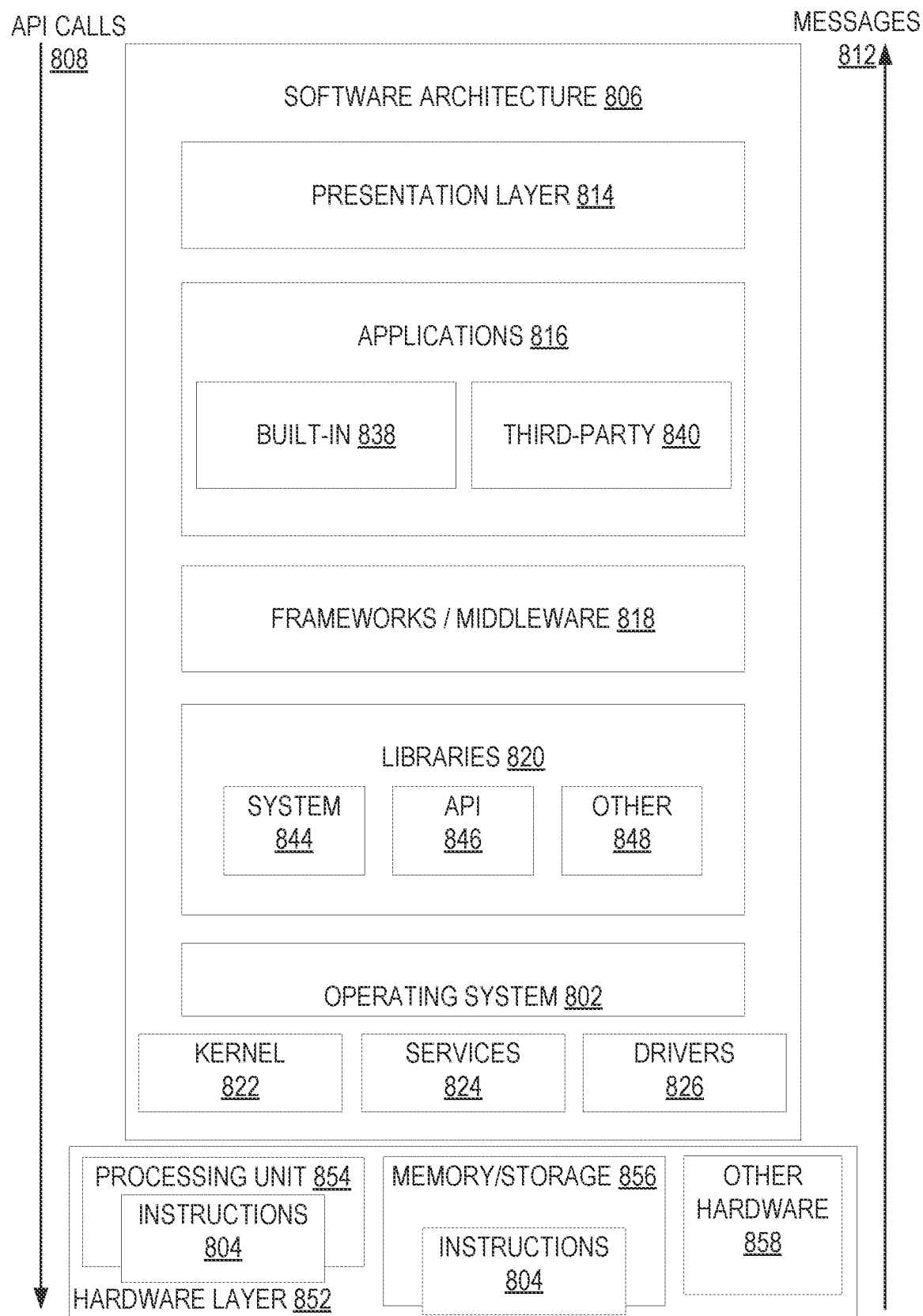
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
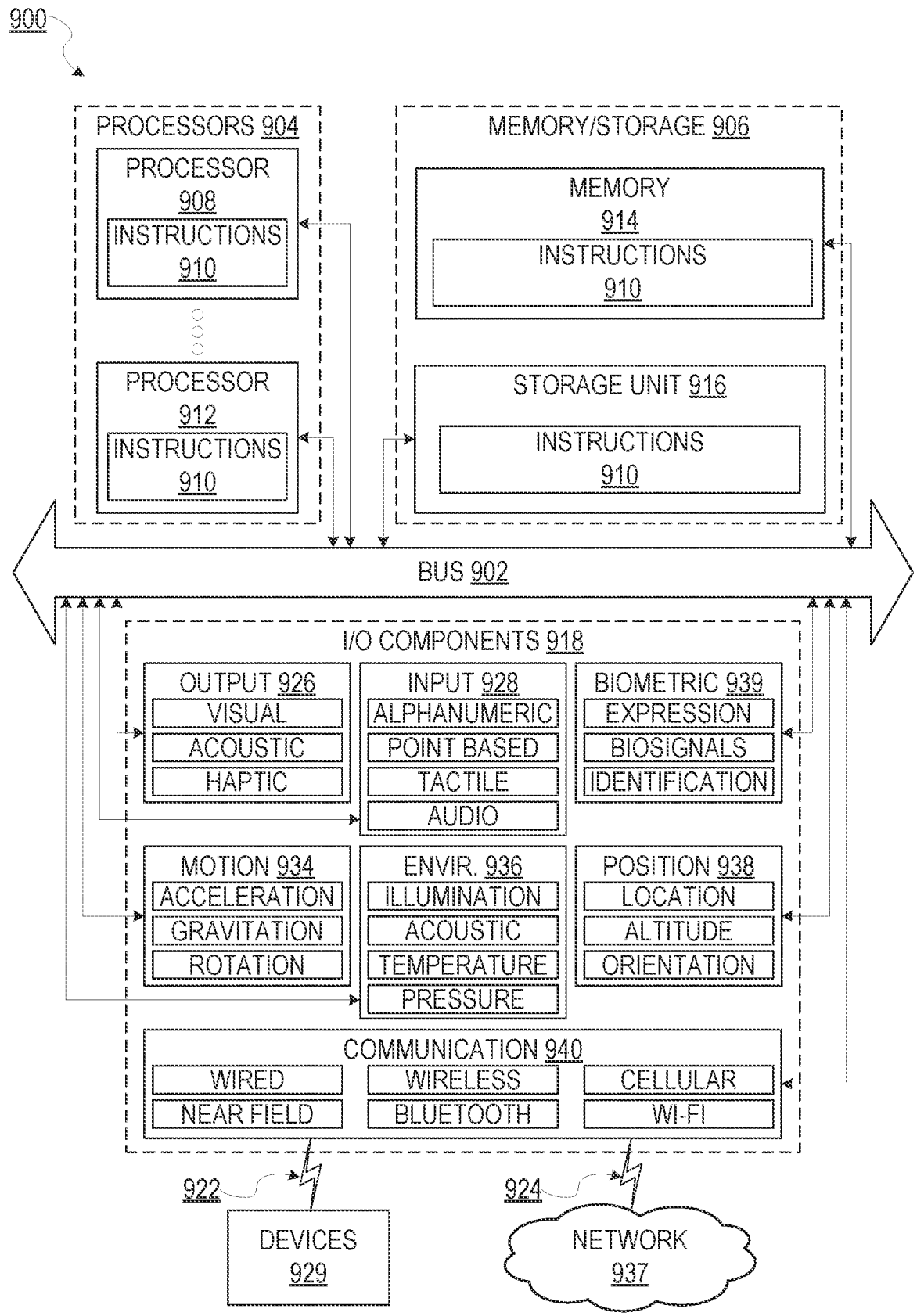
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions contemporaneously. Although FIG. 9 shows multiple processors 904, the machine 900 may include a single processor with a single core, a single processor with multiple cores (e.g., a multi-core processor), multiple processors with a single core, multiple processors with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 939, motion components 934, environmental components 936, or position components 938 among a wide array of other components. For example, the biometric components 939 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 937 or devices 929 via coupling 924 and coupling 922, respectively. For example, the communication components 940 may include a network interface component or other suitable device to interface with the network 937. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 929 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
  receiving split timings for a composite video comprising a plurality of video content items arranged in playback sequence, each split timing indicating a time point in the composite video bounding respective successive video content items, the time points being defined relative to a video base time point;
  receiving a full subtitle file having a plurality of subtitle text items, each subtitle text item having an associated timing relative to a subtitle base time point,
  for each of the time points indicated by the split timings, determining a corresponding threshold timing; and
  splitting the full subtitle file at each of the threshold timings to generate a plurality of video content item subtitle files, each video content item subtitle file including subtitle text items that have associated timings between successive threshold timings, wherein the subtitle text items are included in more than one video content item subtitle file of the plurality of video content item subtitle files based on the threshold timings.

2. The method of claim 1, further comprising:
  controlling the playback of at least one of the video content items to display said at least one video content item together with the subtitle text items in the corresponding video content item subtitle file.

3. The method of claim 1, wherein determining the corresponding threshold timing comprises:
  establishing a correspondence between the video base time point and the subtitle base time point; and
  determining the corresponding threshold timing relative to the subtitle base time point.

4. The method of claim 1, wherein determining the corresponding threshold timing comprises:
  receiving an offset input; and
  determining the corresponding threshold timing based on the offset input.

5. The method of claim 1, further comprising:
  generating an alert where a total duration of the composite video exceeds the duration spanned by the full subtitle file by more than an overrun threshold.

6. The method of claim 1, further comprising:
  generating an alert where a duration spanned by the full subtitle file exceeds a total duration of the composite video.

7. The method of claim 1, wherein the full subtitle file is in at least one of the .vtt and .srt formats.

8. The method of claim 1, wherein the associated timing of a given subtitle text item comprises a range of timings.

9. The method of claim 8, wherein the method further comprises:
  when the timing range spans a threshold timing, including the given subtitle text item in each video content item subtitle file bounded by the threshold timing.

10. A computing apparatus, the computing apparatus comprising:
  a processor; and
  a memory storing instructions that, when executed by the processor, configure the apparatus to:
  receive split timings for a composite video comprising a plurality of video content items arranged in playback sequence, each split timing indicating a time point in the composite video bounding respective successive video content items, the time points being defined relative to a video base time point;
  receive a full subtitle file having a plurality of subtitle text items, each subtitle text item having an associated timing relative to a subtitle base time point,
  for each of the time points indicated by the split timings, determine a corresponding threshold timing; and
  split the full subtitle file at each of the threshold timings to generate a plurality of video content item subtitle files, each video content item subtitle file including subtitle text items that have associated timings between successive threshold timings, wherein the subtitle text items are included in more than one video content item subtitle file of the plurality of video content item subtitle files based on the threshold timings.

11. The computing apparatus of claim 10, wherein the instructions further configure the apparatus to:
  control the playback of at least one of the video content items to display said at least one video content item together with the subtitle text items in the corresponding video content item subtitle file.

12. The computing apparatus of claim 10, wherein determining the corresponding threshold timing comprises:
  establish a correspondence between the video base time point and the subtitle base time point; and
  determine the corresponding threshold timing relative to the subtitle base time point.

13. The computing apparatus of claim 10, wherein determining the corresponding threshold timing comprises:
  receive an offset input; and determine the corresponding threshold timing based on the offset input.

14. The computing apparatus of claim 10, wherein the instructions further configure the apparatus to:
generate an alert where a total duration of the composite video exceeds the duration spanned by the full subtitle file by more than an overrun threshold.

15. The computing apparatus of claim 10, wherein the instructions further configure the apparatus to:
generate an alert where a duration spanned by the full subtitle file exceeds a total duration of the composite video.

16. The computing apparatus of claim 10, wherein the full subtitle file is in at least one of the .vtt and .srt formats.

17. The computing apparatus of claim 10, wherein the associated timing of a given subtitle text item comprises a range of timings.

18. The computing apparatus of claim 17, wherein the instructions further configure the apparatus to:
when the timing range spans a threshold timing, including the given subtitle text item in each video content item subtitle file bounded by the threshold timing.

19. A non-transitory computer-readable storage medium, the computer-readable storage medium including instructions that when executed by a computer, cause the computer to:
receive split timings for a composite video comprising a plurality of video content items arranged in playback sequence, each split timing indicating a time point in the composite video bounding respective successive video content items, the time points being defined relative to a video base time point;
receive a full subtitle file having a plurality of subtitle text items, each subtitle text item having an associated timing relative to a subtitle base time point,
for each of the time points indicated by the split timings, determine a corresponding threshold timing; and
split the full subtitle file at each of the threshold timings to generate a plurality of video content item subtitle files, each video content item subtitle file including subtitle text items that have associated timings between successive threshold timings, wherein the subtitle text items are included in more than one video content item subtitle file of the plurality of video content item subtitle files based on the threshold timings.

20. The computer-readable storage medium of claim 19, wherein the instructions further configure the computer to:
control the playback of at least one of the video content items to display said at least one video content item together with the subtitle text items in the corresponding video content item subtitle file.

* * * * *